(12) United States Patent
Kulkarni et al.

(10) Patent No.: US 10,366,224 B2
(45) Date of Patent: Jul. 30, 2019

(54) SYSTEM AND METHOD FOR SECURING SECURE MEMORY ALLOCATIONS IN AN INFORMATION HANDLING SYSTEM

(71) Applicant: DELL PRODUCTS, LP, Round Rock, TX (US)

(72) Inventors: Yogesh P. Kulkarni, Round Rock, TX (US); Sundar Dasar, Round Rock, TX (US); Sumanth Vidyadhara, Bangalore (IN); Wei Liu, Austin, TX (US); Satyajit D. Desai, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 28 days.

(21) Appl. No.: 15/189,572

(22) Filed: Jun. 22, 2016

(65) Prior Publication Data

US 2017/0372058 A1    Dec. 28, 2017

(51) Int. Cl.
| | |
|---|---|
| *G06F 21/44* | (2013.01) |
| *G06F 21/78* | (2013.01) |
| *G06F 21/60* | (2013.01) |
| *G06F 21/62* | (2013.01) |

(52) U.S. Cl.
CPC ............ *G06F 21/44* (2013.01); *G06F 21/604* (2013.01); *G06F 21/629* (2013.01); *G06F 21/6218* (2013.01); *G06F 21/78* (2013.01)

(58) Field of Classification Search
CPC ...... G06F 21/44; G06F 21/604; G06F 21/629; G06F 21/78
See application file for complete search history.

(56) References Cited

U.S. PATENT DOCUMENTS

| | | | | |
|---|---|---|---|---|
| 6,219,771 | B1* | 4/2001 | Kikuchi ............... | G06F 3/0601 711/164 |
| 8,583,908 | B2 | 11/2013 | Zimmer et al. | |
| 9,495,535 | B2* | 11/2016 | Suryanarayana ... | G06F 21/6218 |
| 2003/0149795 | A1* | 8/2003 | Lamb .................... | G06F 3/0601 709/250 |
| 2007/0143795 | A1* | 6/2007 | Tran ..................... | G06F 11/3636 725/46 |
| 2008/0148399 | A1* | 6/2008 | Winkler ................. | G06F 21/52 726/22 |
| 2008/0244739 | A1* | 10/2008 | Liu ...................... | H04L 63/1458 726/22 |
| 2013/0074186 | A1* | 3/2013 | Muttik .................... | G06F 21/51 726/24 |
| 2014/0215196 | A1* | 7/2014 | Berlin ................... | G06F 21/575 713/2 |
| 2014/0317454 | A1* | 10/2014 | Gataullin ............ | G06F 11/3636 714/45 |
| 2015/0370302 | A1 | 12/2015 | Mudusuru et al. | |
| 2017/0177908 | A1* | 6/2017 | Roper ..................... | G06F 3/061 |

OTHER PUBLICATIONS

U.S. Appl. No. 14/689,706, filed Apr. 17, 2015.

\* cited by examiner

*Primary Examiner* — Carl G Colin
*Assistant Examiner* — Vance M Little
(74) *Attorney, Agent, or Firm* — Larson Newman, LLP

(57) ABSTRACT

An information handling system has a secure data storage partition allocation. Access to the secure storage partition is limited to a set of authorized functions authorized to access the secure storage partition. The authorization of a function may be determined by a unique identification corresponding to the function or a reverse trace.

14 Claims, 5 Drawing Sheets

SYSTEM AND METHOD FOR SECURING SECURE MEMORY ALLOCATIONS IN AN INFORMATION HANDLING SYSTEM

FIELD OF THE DISCLOSURE

The present disclosure generally relates to information handling systems, and more particularly relates to securing data storage allocations in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may have allocated a secure storage partition. Access to the secure storage partition is limited to a set of functions authorized to access the secure storage partition. The authorization of a function may be verified by a unique identification or reverse trace.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
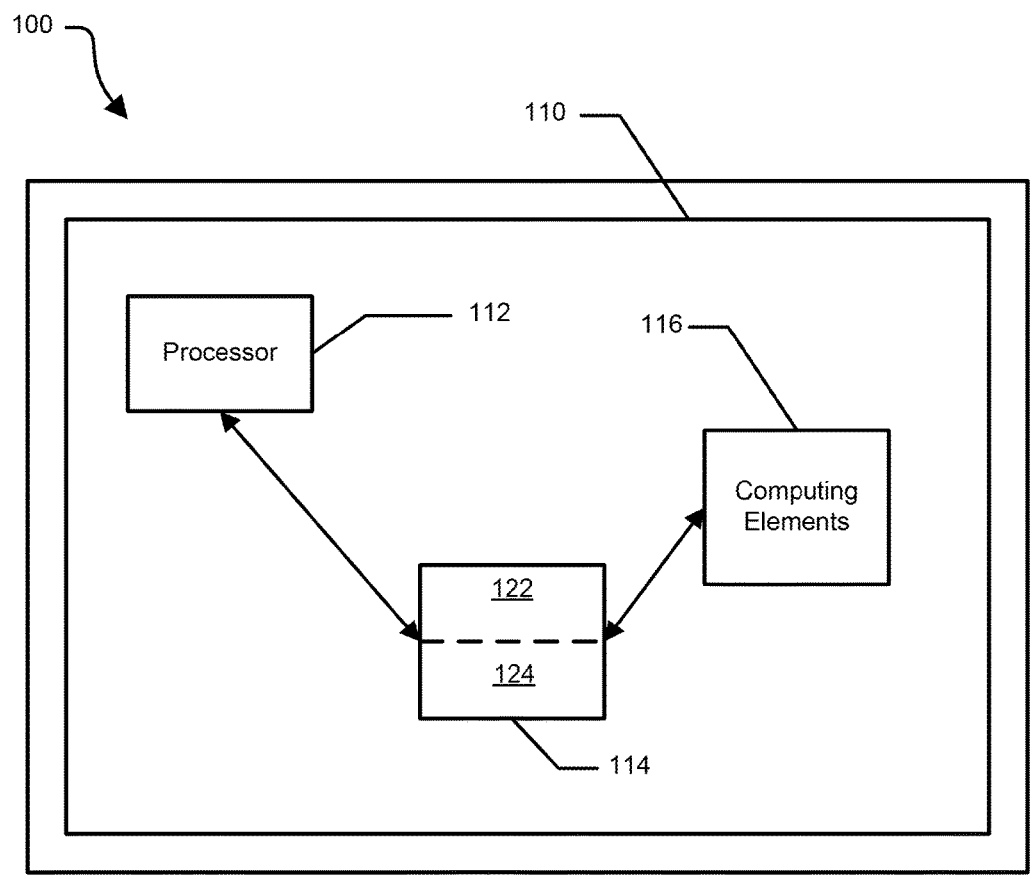
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

An information handling system may include a motherboard that in turn may comprise components such as a data storage and a processor to perform computations. The processor may run BIOS software and operating system software. The BIOS software may be firmware based and perform hardware, for example, motherboard hardware, initialization during booting of the processor. The operating system may be system software that manages motherboard hardware and software resources and provides common services for computer programs. In embodiments, the Unified Extensible Firmware Interface (UEFI) may subsume the BIOS or BIOS functionality.

The information handling system may include storage. For example, the motherboard may have data storage for storing data. The storage may be partitioned into secure and unsecure partitions. It may be desirable to control access to the secure partitions for security such that an unauthorized function or routine may be proscribed from accessing the secure partitions by preventing access to the secure partitions by the unauthorized function or routine. An example of such a storage may be flash memory located on the motherboard to provide data storage for use by the motherboard and components thereof such as a motherboard processor. In a particular embodiment, the storage may be allocated as Universal Serial Bus (USB) partitions.

A manufacturer or producer, such as an Original Equipment Manufacturer (OEM), of the information handling system may desire that a limited and authorized subset of functions, routines and computer programs may access the secure storage partition. For example, the manufacturer may desire that access to the secure storage partitions is limited to authorized functions because the secure storage partitions may be used for boot-up and operation of the information handling system. As would be understood by one of skill in the art, the information handling system may be loaded with various programs and functions from diverse sources. Furthermore, the information handling system may be connected to the internet such that the information handling system is internet-exposed to programs and functions operating over the internet. To ensure the security of the secure storage partitions, it is desirable to control and exclude various programs and functions from accessing the secure partitions.

In one embodiment, when a driver or function is installed on an information handling system, it is given a unique identification. Then the driver or function is registered with the information handling system with its unique identification. The information handling system has a set of authorized unique identifications representing drivers or functions which are authorized to access the secure storage partitions. If it is desired that the registering driver or function have access to the secure partitions, then the unique identification corresponding to the registering driver or function will be added to the set of authorized unique identifications representing drivers or functions which are authorized to access the secure storage partitions.

When a driver or function attempts to access the secure storage partitions, the unique identification corresponding to the driver or function attempting to access the secure storage partitions will be compared with the set of authorized unique identifications representing drivers or functions which are authorized to access the secure storage partitions. If the driver or function is authorized based on the unique identifier, the function or driver will be able to access the secure storage partitions; if the driver or function is not authorized, the function or driver will be unable to access the secure storage partitions.

In an alternate embodiment, in response to a function call to access the secure storage, a reverse trace is executed to determine if the calling function is authorized to access the secure storage; if the function is authorized to access the secure storage, the function may access the secure partition; if the function is unauthorized, the function is denied access to the secure partition. For example, the reverse trace may be used to determine whether the function call is by a proscribed program or function or by an authorized program or function which is authorized to access the secure partition. In embodiments, the results of the reverse trace may be used to determine that the function call is by an authorized program or function by determining the location, for example, in memory, from which the function call originates. When it is determined that the function call is by an authorized program or function, the function call then accesses the secure memory according to the function call. If, however, an authorized program or function fails to be verified as authorized to access the secure memory, the function call is prevented from accessing the secure memory.

More particularly, in embodiments, the manufacturer or producer, for example, the OEM, of the information handling system may implement a function or a set of functions which may be utilized by the information handling system, and this set of functions may be considered a set of proprietary functions. The set of proprietary functions may include an access function to a secure storage partition. This access function may be invoked by another function of the set of proprietary functions. The access function may include reverse trace functionality which may be a further function call such as a reverse trace function. The reverse trace functionality may reverse trace the origin of the function call and may determine a location, a program, or a function from which the access function is asserted. The information handling system may include an authorized list which lists programs and functions which are authorized to be permitted to access the secure storage partition.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a desktop computer, a laptop computer, a smart phone, a tablet device or other consumer electronic device, a network server, a network storage device, a switch router or other network communication device, or any other computing device and may vary in size, shape, performance, functionality, and price. Information handling system 100 may be connectable to the internet (not shown).

Information handling system 100 includes a motherboard 110, and may also include other components such as a display or input/output (I/O) devices or components such as a keyboard (not shown). Motherboard 110 includes a processor 112, a data storage 114, and computing elements 116. Computing elements 116 may comprise multiple computing elements such as subsidiary motherboard processors. Motherboard 110 may include other components and drivers not shown. In addition, motherboard 110 includes one or more busses coupling processor 112 with storage 114 and may include one or more busses connecting storage 114 with one or more elements of computing elements 116. Thus, processor 112 may access storage 114 and one or more elements of computing elements 116 may access storage 114.

Storage 114 is allocated or partitioned into a unsecure storage partition 122 and a secure storage partition 124. In embodiments, storage 114 comprises flash memory and as such is an electronic (solid-state) non-volatile computer storage medium that can be electrically erased and reprogrammed. Storage 114 may be allocated as USB partitions and some of these partitions may form secure storage partition 124.

In operation of information handling system 100, processor 112 may operate or function as a host and computing elements 116 may operate or function as a server on motherboard 110 such as, for example, an integrated Remote Access Controller providing a Lifecycle Controller to the motherboard which simplifies server lifecycle management tasks like provisioning, deployment, servicing, user customization, patching and updating. Lifecycle drivers run on computing elements 116 provide a collection of out-of-band automation services, embedded pre-OS applications, and remote interfaces.

When processor 112 operates or functions as a host of motherboard 110, processor 112 may run or execute a BIOS and operating system. The BIOS may be involved in booting information handling system 100.

Figure 2:
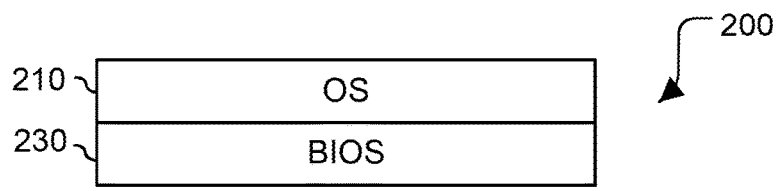
FIG. 2 is a block diagram illustrating a structure of a software stack according to an embodiment of the present disclosure.

FIG. 2 shows a software stack 200 that may run on processor 112 of FIG. 1. Software stack 200 includes operating system 210, and BIOS 230. Operating system 210 may interface with application programs. BIOS 230 may be part of or subsumed into the UEFI protocol. BIOS 230 operates at the firmware level above the hardware level of the processor executing BIOS 230, for example processor 112 of FIG. 1. BIOS 230 may execute a pre-boot verify upon booting of the associated information handling system and may execute diverse drivers upon start-up and be internet exposed if the associated information handling system is connected to the internet. Thus, software stack 200 may be exposed to diverse drivers and functions outside of OEM control.

Returning to FIG. 1, to ensure the security of secure storage partition 124 it may be desirable to ensure that access to secure storage partition 124 is limited to a set or subset of authorized drivers and functions. Other drivers and functions may be prevented from accessing or denied access to secure storage partition 124 such that access to secure storage partition 124 is limited to the set of authorized drivers and functions exclusive of other drivers and functions, which may be referred to as unauthorized drivers and functions. Thus, unauthorized drivers and functions are prevented from accessing secure storage partition 124.

In embodiments, to limit access to secure memory partition 124 to authorized drivers and functions, a registration process may be used to provide access to secure memory partition 124 by authorized drivers and functions and to proscribe unauthorized drivers and functions from accessing secure memory partition 124.

Figure 3:
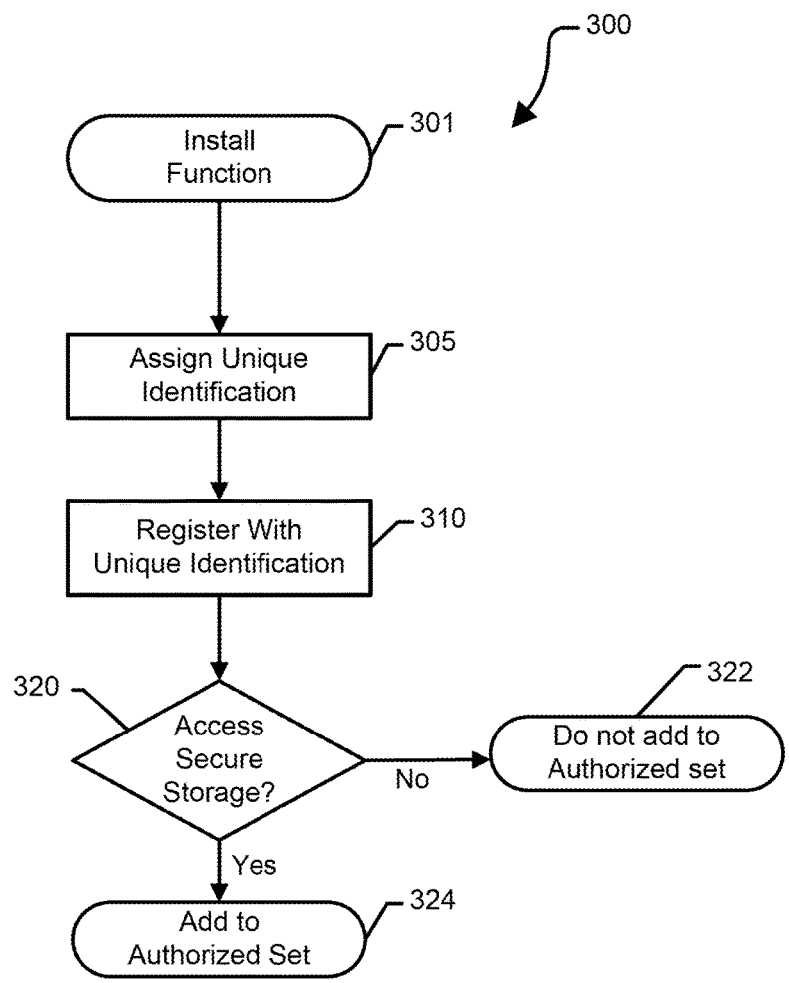
FIG. 3 is a flow diagram illustrating a method of registration for secure storage.

FIG. 3 shows a registration process 300. At 301, the process begins with the installation of a function or driver in information handling system 100. This may be a temporary installation, such as a temporary download or saving of a function to memory, from which the function will be subsequently removed, for example, by over-writing. At 305, the installed function or driver is assigned a unique identification representing the installed function or driver. At 310, the installed function or driver is registered, for example, with information handling system 100 by the assigned unique identification representing the installed function or driver.

At 320, it is determined if the installed function or driver is to be allowed access to secure memory partition 124. If the function or driver is proscribed from access to secure memory partition 124, at 322, the unique identification representing the installed function or driver is not added to an authorized set of unique identifications representing functions and allowed access to secure memory partition 124. If the function or driver is to have access to secure memory partition 124, at 324, the unique identification representing the installed function or driver is added to an authorized set of unique identifications representing functions and allowed access to secure memory partition 124.

In embodiments, the set of unique identifications representing the drivers and functions authorized to access secure storage partition 124 may be maintained as a list of unique identifications by computing elements 116, and more specifically, the Lifecycle Controller running on computing elements 116.

Figure 4:
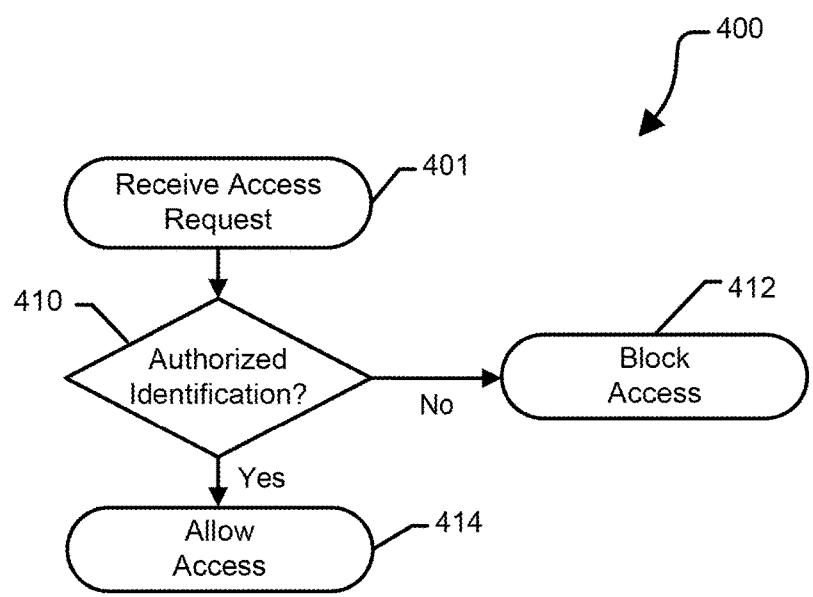
FIG. 4 is a flow diagram illustrating a method for securing storage.

FIG. 4 shows a method 400 for securing storage. At 401, a request is received to access secure storage. At 410, the unique identification representing the requesting function or driver is compared with the set of unique identifications representing the drivers and functions authorized to access secure storage partition 124. If the unique identification of the requesting function or driver is not enunciated in the set of unique identifications representing authorized drivers and functions, then at 412, the request to access secure storage will be denied such that the requesting function will be blocked from accessing secure storage partition 124. If, however, the unique identification of the requesting function or driver is enunciated in the set of unique identifications representing authorized drivers and functions, then at 414, the request to access secure storage will be allowed such that the requesting function will access secure storage partition 124.

In embodiments, the unique identification may be allocated as a private key in a private/public key security protocol.

In further embodiments, to limit access to secure memory partition 124 to authorized drivers and functions, a proprietary driver or function may be provided by the OEM of the information handling system 100 and motherboard 110 for accessing secure storage partition 124. Such a proprietary driver may be referred to as a secure storage partition access function. This secure storage partition access function may access secure storage partition 124. Invocation of the secure storage partition access function may be limited to authorized drivers and functions authorized to access secure storage partition 124. Access to secure storage partition 124 is limited to the secure storage partition access function or authorized drivers and functions invoking the same such that other drivers or functions are prevented from accessing secure storage partition 124.

Information handling system 100 may maintain a list of the authorized drivers and functions authorized to access secure storage partition 124. Invocation of the secure storage partition access function may be limited to the authorized drivers and functions in this list of the authorized drivers and functions authorized to access secure storage partition 124, thereby limiting access to secure storage partition 124 to these authorized drivers and functions. In embodiments, the list of the authorized drivers and functions authorized to access secure storage partition 124 may be maintained by computing elements 116, and more specifically, the Lifecycle Controller running on computing elements 116.

To the end of limiting invocation of the secure storage partition access function to the authorized drivers and functions authorized to access secure storage partition 124, the secure storage partition access function may include reverse trace functionality which may confirm or ensure that the secure storage partition access function is invoked by authorized drivers and functions authorized to access secure storage partition 124 from the list of authorized drivers and functions authorized to access secure storage partition 124.

Figure 5:
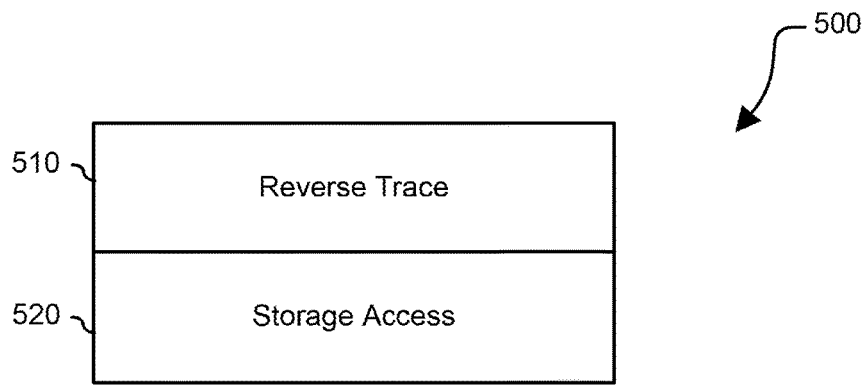
FIG. 5 is a block diagram illustrating a structure of a secure storage access function according to an embodiment of the present disclosure.

FIG. 5 illustrates the structure of a secure storage partition access function 500. Secure storage partition access function 500 includes reverse trace function 510 and storage access function 520. When secure storage partition access function 500 is invoked by a program, function, or driver, prior to execution of storage access function 520, reverse trace function 510 is executed. Reverse trace function 510 reverse traces the program, function, or driver invoking secure storage partition access function 500 to determine the program, function, or driver invoking secure storage partition access function 500. Secure storage partition access function 300 then determines if the determined program, function, or driver is authorized to access secure storage partition 124 by comparing the determined program, function, or driver with the list of authorized drivers and functions authorized to access secure storage partition 124. If the program, function, or driver invoking secure storage partition access function 500 is on the list and thus authorized to access secure storage partition 124, then storage access function 520 is executed, thereby accessing secure storage partition 124. If the program, function, or driver invoking secure storage partition access function 500 is not on the list and is thus precluded from accessing secure storage partition 124, then storage access function 520 is not executed, and secure storage partition access function 500 fails to access secure storage partition 124.

In embodiments, reverse trace function 510 may determine the program, function, or driver invoking secure storage partition access function 500 by reverse tracing the location of the program, function, or driver invoking secure storage partition access function 500. If the location of the program, function, or driver indicates that the program, function, or driver is not on the list of authorized drivers and functions authorized to access secure storage partition 124, then reverse trace function 510 determines the program, function, or driver invoking secure storage partition access function 500 is not authorized to access secure storage partition 124. If however, the invocation of secure storage partition access function 500 originates from a secure location, then reverse trace function 510 determines the program, function, or driver invoking secure storage partition access function 500 is authorized to access secure storage partition 124.

Figure 6:
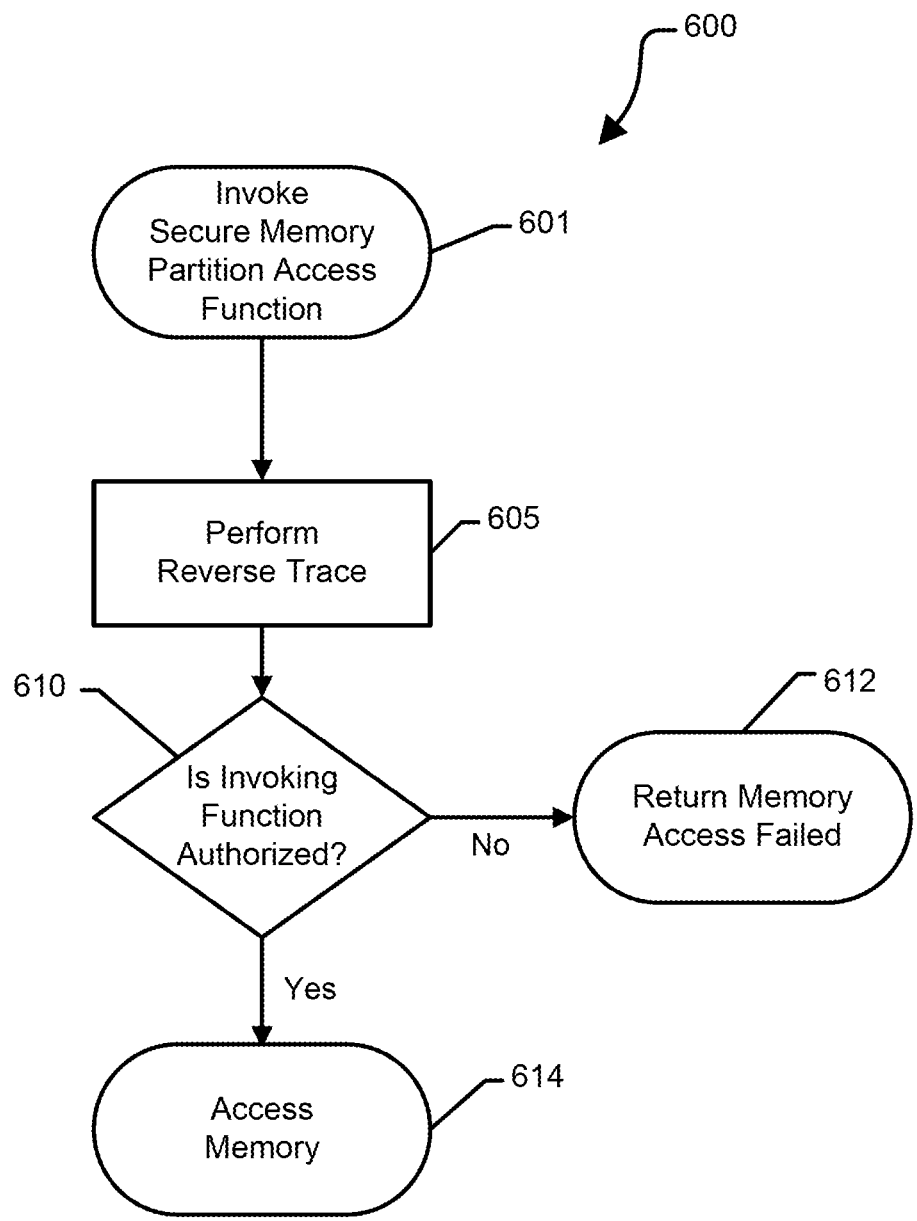
FIG. 6 is a flow diagram illustrating a method of operation of a secure storage access function according to an embodiment of the present disclosure.

FIG. 6 is a flowchart 600 of an embodiment of operation of secure storage partition access function 500. At 601, secure storage partition access function 500 is invoked. At 605, secure storage partition access function 500 performs a reverse trace to determine the invoking function. For example, the reverse trace may determine a location of the invoking function so that the invoking program, function, or driver may be determined. At 610 it is determined if the invoking function is an authorized function. For example, the determined invoking program, function, or driver may be compared to a list of authorized functions and drivers authorized to access secure storage partition 124. If it is determined that the determined invoking program, function, or driver is not an authorized function, then at 612, secure storage partition access function 500 returns memory access failure such that the invoking function will be blocked from accessing secure storage partition 124. If, however, it is determined that the determined invoking program, function, or driver is an authorized function, then at 614, secure storage partition access function 500 accesses secure storage partition 124.

In implementations, secure storage partition access function 500 is a BIOS level command or function. Thus, secure storage partition access function 500 may be a firmware command or function implemented at the lowest software level above the hardware level. Secure storage partition access function 500 may be the sole and unique command for accessing the secure storage such that authorized functions use secure storage partition access function 500 to access secure storage. A higher level function or command may be parsed as it traverses lower levels for implementation and if the higher level function or command involves accessing the secure storage, then the higher level function or command may be parsed as it traverses the software stack into a set of lower level commands comprising secure storage partition access function 500.

Furthermore, because secure storage partition access function 500 is a BIOS level command or function with sole access to the secure storage, access to the secure storage cannot be obtained by a higher level program, function, or driver invoking a BIOS level access command to access the secure storage. That is, use of secure storage partition access function 500 to access the secure storage cannot be circumvented.

Figure 7:
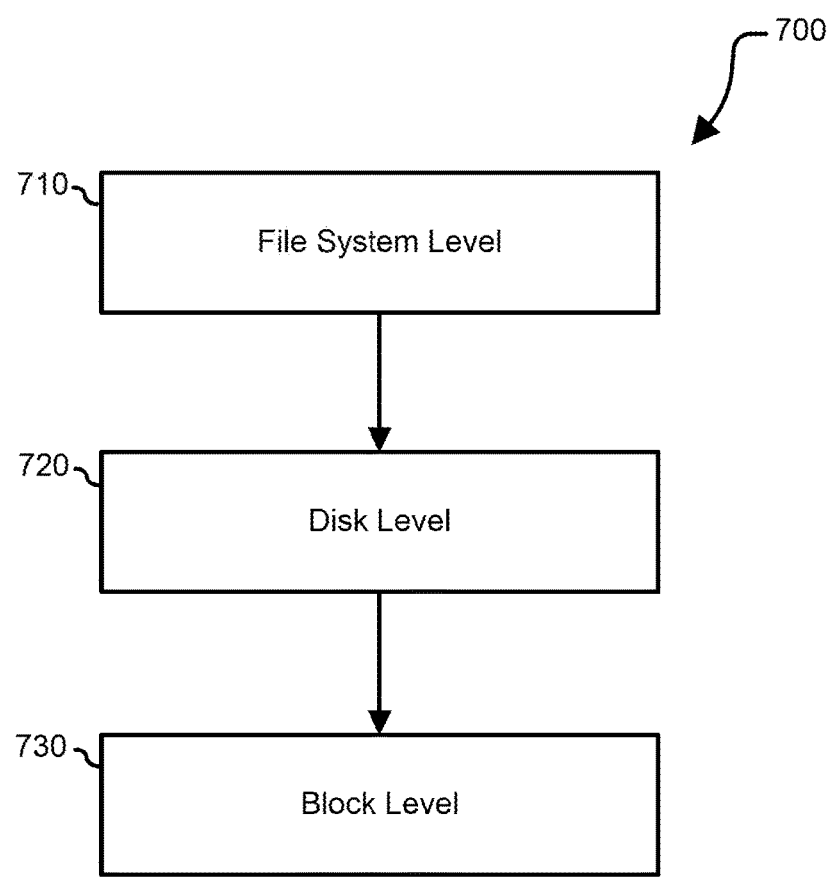
FIG. 7 is a flow diagram illustrating a method of parsing a command involving secure storage into a set of commands.

FIG. 7 is a flowchart 700 of an embodiment of parsing a command into a set of commands including a secure storage partition access function at the BIOS level. At 710, a file system level command, function, or driver is invoked. The invoked file system level command, function, or driver involves accessing secure storage. At 720, the invoked file system level command, function, or driver is translated into a set of commands at the disk level. Disk level commands are at the BIOS level above the hardware level and implemented by firmware. At 710, the disk level commands are further parsed into a set of commands at the block level. Block level commands are at the BIOS level above the hardware level and implemented by firmware. The set of commands at the block level will include a call to secure storage partition access function 500 because the parsed file system level command, function, or driver involved accessing secure storage. As would be understood by one of skill in the art, because secure storage partition access function 500 is at the BIOS level above the hardware level, access to the secure storage cannot be circumvented by using low level firmware commands to access the secure storage.

While in the above, a secure storage access function is described at the block level, a secure storage access function may be implemented at any level in BIOS from the file system level to the block level.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a hardware processor; and
a data storage, the data storage storing a basic input/output system, the basic input/output system when executed causing the hardware processor to perform operations including:
partitioning the data storage to include a secure storage partition to which an access is restricted;
storing a set of authorized memory locations, with each authorized memory location in the set of authorized memory locations authorized to access the secure storage partition;
receiving a function call requesting the access to the secure storage partition, wherein the function call is a BIOS function call;
reverse tracing the BIOS function call to determine a memory location representing an origin of the BIOS function call;
comparing the memory location to the set of authorized memory locations authorized for the access to the secure storage partition;
in response to the memory location satisfying the set of authorized memory locations, authorizing the BIOS function call for the access to the secure storage partition;
in response to the memory location failing to satisfy the set of authorized memory locations, blocking the BIOS function call from accessing the secure storage partition, and
determining a software program representing the origin of the BIOS function call.

2. The information handling system of claim 1, wherein the operations further comprise determining a driver representing the origin of the BIOS function call.

3. The information handling system of claim 2, wherein the operations further comprise determining the origin of the BIOS function call is accessible via the Internet.

4. The information handling system of claim 1, wherein the operations further comprise denying the BIOS function call.

5. A method for controlling an access to a flash memory, the method comprising:
- partitioning, by a hardware processor, a portion of the flash memory as a secure storage partition;
- storing, by the hardware processor, a list of memory locations in the flash memory, each memory location in the list of memory locations authorized for the access to the secure storage partition;
- receiving, by the hardware processor, a basic input/output system (BIOS) function call requesting the access to the secure storage partition;
- reverse tracing, by the hardware processor, the BIOS function call to determine a memory location as an origin of the BIOS function call;
- comparing, by the hardware processor, the memory location to the list of memory locations authorized for the access to the secure storage partition; and
- if the memory location satisfies the list of memory locations, then authorizing, by the hardware processor, the BIOS function call for the access to the secure storage partition; and
- if the memory location fails to satisfy the list of memory locations, then blocking, by the hardware processor, the BIOS function call from accessing the secure storage partition.

6. The method of claim 5, further comprising determining a software program representing the origin of the BIOS function call.

7. The method of claim 5, further comprising determining a driver representing the origin of the BIOS function call.

8. The method of claim 5, further comprising determining the origin of the BIOS function call is accessible via the Internet.

9. A method performed in an information handling system for accessing a flash memory, the method comprising:
- partitioning, by a hardware processor, a portion of the flash memory as a secure storage partition;
- storing, by the hardware processor, driver identifiers in the flash memory, the driver identifiers uniquely identifying software drivers authorized for an access to the secure storage partition;
- receiving, by the hardware processor, a basic input/output system (BIOS) function call requesting the access to the secure storage partition;
- reverse tracing, by the hardware processor, the BIOS function call to determine a memory location that originated the BIOS function call;
- determining, by the hardware processor, a driver identifier of the driver identifiers that corresponds to the memory location that originated the BIOS function call;
- comparing, by the hardware processor, the memory location to the memory locations that are authorized for the access to the secure storage partition;
- authorizing, by the hardware processor, the BIOS function call for the access to the secure storage partition in response to the memory location matching one of the memory locations that is authorized for the access to the secure storage partition; and
- blocking, by the hardware processor, the BIOS function call from accessing the secure storage partition in response to the memory location failing to match any of the memory locations that is authorized for the access to the secure storage partition.

10. The method of claim 9, further comprising determining the software driver is accessed via the Internet.

11. The method of claim 9, further comprising determining the driver identifier is a private/public key pair.

12. The method of claim 9, further comprising allocating the secure storage partition for uniform serial bus partitions.

13. The method of claim 9, further comprising executing the software driver.

14. The method of claim 9, further comprising assigning the driver identifier to the software driver.

* * * * *